US012367836B2

(12) United States Patent
Sun et al.

(10) Patent No.: US 12,367,836 B2
(45) Date of Patent: Jul. 22, 2025

(54) DISPLAY METHOD AND DISPLAY APPARATUS

(71) Applicants: WUHAN TIANMA MICROELECTRONICS CO., LTD., Wuhan (CN); Wuhan Tianma Microelectronics Co., Ltd. Shanghai Branch, Shanghai (CN)

(72) Inventors: Chenguang Sun, Wuhan (CN); Xinyang Li, Wuhan (CN); Zhenqiang Li, Wuhan (CN); Xingyao Zhou, Wuhan (CN); Yana Gao, Wuhan (CN); Shuai Yang, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/417,182

(22) Filed: Jan. 19, 2024

(65) Prior Publication Data

US 2024/0161700 A1 May 16, 2024

(30) Foreign Application Priority Data

May 31, 2023 (CN) ........................ 202310649175.4

(51) Int. Cl.
*G09G 3/3258* (2016.01)

(52) U.S. Cl.
CPC ... *G09G 3/3258* (2013.01); *G09G 2300/0814* (2013.01); *G09G 2310/0286* (2013.01);
(Continued)

(58) Field of Classification Search
CPC ......... G09G 3/3258; G09G 2300/0814; G09G 2310/0286; G09G 2310/061;
(Continued)

(56) References Cited

U.S. PATENT DOCUMENTS

2007/0008348 A1 * 1/2007 Nishi .................. H04N 7/0137 345/698
2018/0033360 A1 * 2/2018 Bae ...................... G09G 3/2096
(Continued)

FOREIGN PATENT DOCUMENTS

CN 113160748 B 3/2022

*Primary Examiner* — David Tung
(74) *Attorney, Agent, or Firm* — CHRISTENSEN O'CONNOR JOHNSON KINDNESS PLLC

(57) ABSTRACT

A display method is applied to a display apparatus including a display panel, a display driver chip, and a microprocessor. The display method includes outputting, by the display panel, a scanning-done signal of a first frame image generated after scanning rows of pixel circuits of the display panel; after the microprocessor or the display driver chip receives the scanning-done signal, writing, by the display driver chip, initial data of a second frame image provided by the microprocessor and outputting, by the display driver chip, display data of the second frame image to the display panel based on the initial data; or outputting, by the display driver chip, the display data of the second frame image to the display panel in response to the scanning-done signal, the display data being generated based on the initial data provided by the microprocessor. The second frame image follows the first frame image.

13 Claims, 7 Drawing Sheets

(52) U.S. Cl.
CPC ... *G09G 2310/061* (2013.01); *G09G 2310/08* (2013.01); *G09G 2320/0247* (2013.01); *G09G 2320/0257* (2013.01); *G09G 2340/0435* (2013.01); *G09G 2360/121* (2013.01)

(58) Field of Classification Search
CPC ....... G09G 2310/08; G09G 2320/0247; G09G 2320/0257; G09G 2340/0435; G09G 2360/121
See application file for complete search history.

(56) References Cited

U.S. PATENT DOCUMENTS

| | | | | |
|---|---|---|---|---|
| 2019/0325797 | A1* | 10/2019 | Kanda | H01L 27/124 |
| 2021/0375188 | A1* | 12/2021 | Kim | G09G 3/20 |
| 2022/0005392 | A1* | 1/2022 | Lee | G09G 5/395 |

* cited by examiner

DISPLAY METHOD AND DISPLAY APPARATUS

CROSS-REFERENCE TO RELATED APPLICATIONS

The present application claims priority to Chinese Patent Application No. 202310649175.4, filed on May 31, 2023, the content of which is incorporated herein by reference in its entirety.

TECHNICAL FIELD

The present disclosure relates to the field of display technologies, and in particular, to a display method and a display apparatus.

BACKGROUND

Screen tearing happens when a display shows two or more frames simultaneously on a same screen. The display panel takes a relatively long time to complete data writing. While the display driver chip is ready, the display panel might not be ready for display. If the tear effect signal is activated in this case, the display screen is torn.

SUMMARY

Embodiments of the present disclosure provide a display method and a display apparatus, to resolve the problem of display screen tearing in the related art.

According to a first aspect, an embodiment of the present disclosure provides a display method applied to a display apparatus including a display panel, a display driver chip, and a microprocessor. The display method includes: outputting, by the display panel, a scanning-done signal of a first frame image generated after scanning a plurality of rows of pixel circuits of the display panel; and after the microprocessor or the display driver chip receives the scanning-done signal, writing, by the display driver chip, initial data of a second frame image provided by the microprocessor and outputting, by the display driver chip, display data of the second frame image to the display panel based on the initial data; or outputting, by the display driver chip the display data of the second frame image to the display panel in response to the scanning-done signal, the display data being generated based on the initial data provided by the microprocessor. The second frame image is a next frame image of the first frame image.

According to a second aspect, an embodiment of the present disclosure provides a display apparatus including a display panel, a display driver chip, and a microprocessor. The display panel is configured to output a scanning-done signal of a first frame image generated after scanning a plurality of rows of pixel circuits of the display panel. The display driver chip is configured to: write initial data of a second frame image after the microprocessor or the display driver chip receives the scanning-done signal, and output display data of the second frame image to the display panel based on the initial data; or the display driver chip is configured to: output the display data of the second frame image to the display panel in response to the scanning-done signal, wherein the display data is generated based on the initial data. The second frame image follows the first frame image.

According to a third aspect, an embodiment of the present disclosure provides a display apparatus configured to display images by using a display method. The display method includes: outputting, by the display panel, a scanning-done signal of a first frame image generated after scanning a plurality of rows of pixel circuits of the display panel; and after the microprocessor or the display driver chip receives the scanning-done signal, writing, by the display driver chip, initial data of a second frame image provided by the microprocessor and outputting, by the display driver chip, display data of the second frame image to the display panel based on the initial data; or outputting, by the display driver chip the display data of the second frame image to the display panel in response to the scanning-done signal, the display data being generated based on the initial data provided by the microprocessor. The second frame image is a next frame image of the first frame image.

BRIEF DESCRIPTION OF DRAWINGS

To describe the technical solutions in the embodiments of the present disclosure or in the related art more clearly, the following briefly describes the accompanying drawings required for describing the embodiments or the related art. The accompanying drawings in the following description illustrate some embodiments of the present disclosure, and a person skilled in the art may still derive other drawings from these accompanying drawings.

DESCRIPTION OF EMBODIMENTS

To make the objectives, technical solutions, and advantages of the embodiments of the present disclosure clearer, the technical solutions in the embodiments of the present disclosure will be clearly and completely described below with reference to the accompanying drawings in the embodiments of the present disclosure. The described embodiments are some rather than all of the embodiments of the present disclosure. All other embodiments obtained by those of ordinary skill in the art based on the embodiments of the present disclosure should fall within the protection scope of the present disclosure.

Terms used in the embodiments of the present disclosure are only for the purpose of describing specific embodiments and are not intended to limit the present disclosure. Unless otherwise specified in the context, words, such as "a", "the", and "this", in a singular form in the embodiments of the present disclosure and the appended claims include plural forms.

Figure 1:
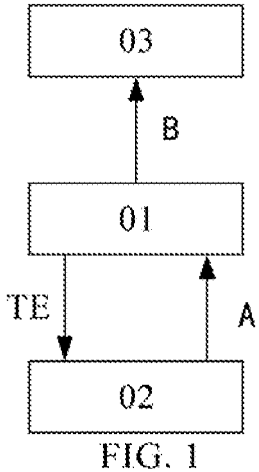
FIG. 1 is a schematic diagram of a display method in the related art.

FIG. 1 is a schematic diagram of a display method in the related art. As shown in FIG. 1, in the related display scheme, a tear effect signal is transmitted from a display driver chip 01 to a microprocessor 02. After the microprocessor 02 receives an active edge of a tear effect signal TE, that is, the tear effect signal in an activated state, it proceeds to phase A where the microprocessor 02 starts to write data to a random access memory (RAM) of the display driver chip 01. After the corresponding data is completely written, it proceeds to phase B where the display driver chip 01 starts to write the corresponding display data to the display panel 03. In the process of writing the corresponding display data to the display panel 03, the signal in the RAM needs to remain stable, which is controlled by the tear effect signal TE. If the tear effect signal TE is activated when the display driver chip 01 is still writing the display data to the display panel 03, the data stored in the display driver chip 01 is overwritten by the data of the next frame, but the writing phase of the display data of the current frame has not been completed, which affects the writing of the display data of the current frame and leads to screen tearing. In the related design, the display driver chip 01 sends, at a preset frequency, the tear effect signal in the activated state to the microprocessor 02, and the display driver chip 01 cannot determine the moment at which the display panel 03 stops writing the display data. The display driver chip 01 may still write the display data to the display panel 03, but the tear effect signal is activated again, causing the microprocessor 02 to write data to the display driver chip 01 again. In this case, a change in the data in the RAM results in a change in the display data and causes display screen tearing.

To resolve the problem in the related art, an embodiment of the present disclosure provides a display method. In the display method, a display panel outputs a scanning-done signal of a first frame image generated after scanning multiple rows of pixel circuits of the display panel, and the scanning-done signal indicates that the display panel completes the data writing process of this frame image. After the scanning-done signal is output, the display driver chip starts to output display data of a second frame image to the display panel, or a RAM of the display driver chip starts to write initial data of the second frame image provided by a microprocessor, and the first frame image and the second frame image are two consecutive frame images. In the display method provided in this embodiment of the present disclosure, the display driver chip outputs the display data of the second frame image to the display panel after the display panel outputs the scanning-done signal, that is, the display driver chip does not provide the display data of the next frame to the display panel before the data writing process of the current frame is completed, thereby ensuring the display integrity of the frame images and avoiding screen tearing.

Figure 2:
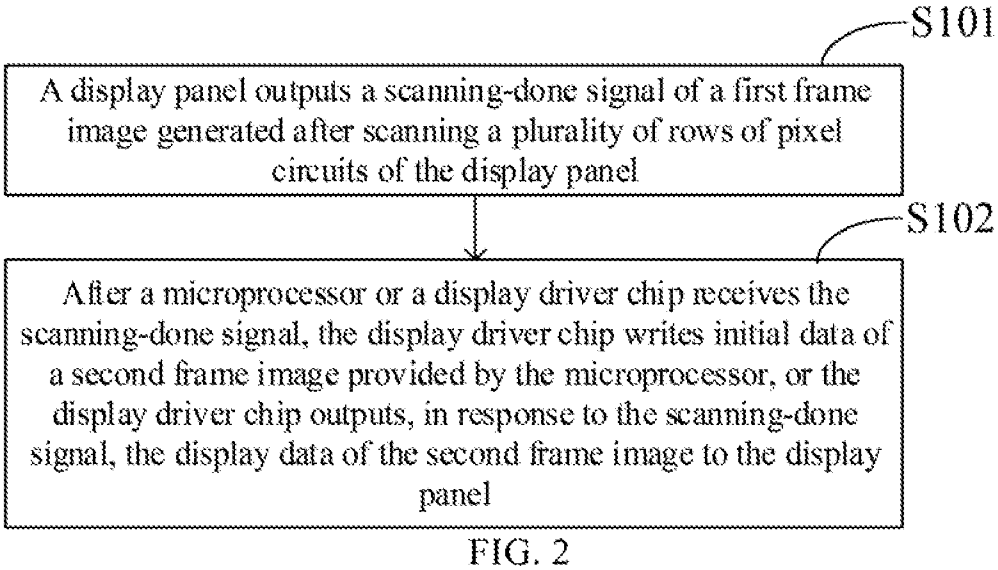
FIG. 2 is a flowchart of a display method according to an embodiment of the present disclosure.

An embodiment of the present disclosure provides a display method applied to a display apparatus including a display panel, a display driver chip, and a microprocessor. The display panel is coupled to the display driver chip, and the display driver chip is coupled to the microprocessor. FIG. 2 is a flowchart of a display method according to an embodiment of the present disclosure. As shown in FIG. 2, the display method includes steps S101 and S102.

At step S101, the display panel outputs a scanning-done signal SD of a first frame image generated after scanning multiple rows of pixel circuits of the display panel. The display panel includes the multiple rows of pixel circuits, and one row of pixel circuits include pixel circuits and configured to drive sub-pixels. When a row of pixel circuits is scanned, row grayscale data is written into this row of pixel circuits, that is, when displaying an image, a period of scanning the row of pixel circuits matches a period of writing the row grayscale data into the row of pixel circuits, to make sub-pixels driven by the row of pixel circuits to display. The rows of pixel circuits in the display panel are scanned row by row, and the scanning process of a frame image is completed after the pixel circuits in all rows are scanned once. At step S101, the display panel outputs the scanning-done signal SD of the frame image generated after scanning multiple rows of pixel circuits of the display panel, and the scanning-done signal SD indicates that the display panel completes a whole data writing process of one frame image. The scanning-done signal SD is used as a feedback signal output by the display panel after completing the scanning process of one frame image. The display panel outputting the scanning-done signal SD indicates that the display panel is ready to receive display data of a next frame image.

At step S102, after the microprocessor or the display driver chip receives the scanning-done signal SD, the display driver chip writes initial data of a second frame image provided by the microprocessor and outputs display data of the second frame image to the display panel based on the initial data; or the display driver chip outputs, in response to the scanning-done signal SD, the display data of the second frame image to the display panel, where the display data is generated based on the initial data provided by the microprocessor. The first frame image and the second frame image are two images to be displayed successively on the display panel, and the second frame image follows the first frame image, that is, the display panel displays the second frame image after displaying the first frame image.

The display panel displaying one frame image includes: providing, by the microprocessor, initial data of the image to the display driver chip; generating, by the display driver chip, display data suitable for the display panel based on the initial data of the image; providing, by the display driver chip, the display data to the display panel; and displaying, by the display panel, the frame image based on the display data. The display driver chip includes a RAM which has the functions of writing data and reading data, the initial data provided by the microprocessor is written to the RAM, and the RAM reads the initial data to generate the display data. Since the display panel takes a long time to write the data, the display driver chip completes outputting the display data to the display panel at a moment earlier than a moment at which the display panel completes the scanning process of the frame image. In the related art, the process of providing the display data from the display driver chip to the display panel is a unidirectional process, that is, the display panel only receives the display data for displaying the image, and the display panel does not provide any feedback on the image display state.

In the display method according to this embodiment of the present disclosure, the display panel outputs the scanning-done signal SD of the first frame image generated after scanning multiple rows of pixel circuits of the display panel, and the scanning-done signal SD is a feedback signal output by the display panel after scanning the first frame image. Outputting the scanning-done signal SD by the display panel indicates that the display panel is ready to receive display data of a next frame image. After the display panel outputs the feedback signal, that is, the scanning-done signal SD, the display driver chip writes the initial data of the second frame image provided by the microprocessor or outputs the display data of the second frame image to the display panel in response to the scanning-done signal SD. When the display panel successively displays the first frame image and the second frame image, the display panel outputs the scanning-done signal SD to actively provide feedback on the scanning completion of the first frame image. The display driver chip outputs the display data of the second frame image to the display panel after the display panel outputs the scanning-done signal SD, such that the display driver chip does not provide the display data of the next frame to the display panel before the data writing process of the current frame is completed, thereby ensuring the display integrity of the frame images and avoiding screen tearing.

In some embodiments, the display panel outputs the scanning-done signal SD, and the scanning-done signal SD is sent to the microprocessor and triggers the microprocessor to provide the initial data of the image to the display driver chip. After the microprocessor provides the initial data of the image to the display driver chip, the display driver chip can start to receive the initial data (or start to write the initial data). This implementation separates the time period in which the display driver chip outputs the display data to the display panel from the time period in which the display driver chip writes the initial data. In other embodiments, the display panel outputs the scanning-done signal SD, and the scanning-done signal SD is sent to the display driver chip and triggers the display driver chip to start to receive the initial data of the image written by the microprocessor, thereby separating the time period in which the display driver chip outputs the display data to the display panel from the time period in which the display driver chip writes the initial data. In other embodiments, the display panel outputs the scanning-done signal SD, and the scanning-done signal SD is sent to the display driver chip and triggers the display driver chip to output the display data of the image to the display panel, such that the time periods in which the display driver chip outputs the display data of two consecutive frame images do not overlap, that is, after the display data of one frame image is output, the display data of the next frame is output. The display method according to the embodiments of the present disclosure is described in detail below with reference to specific embodiments.

Figure 3:
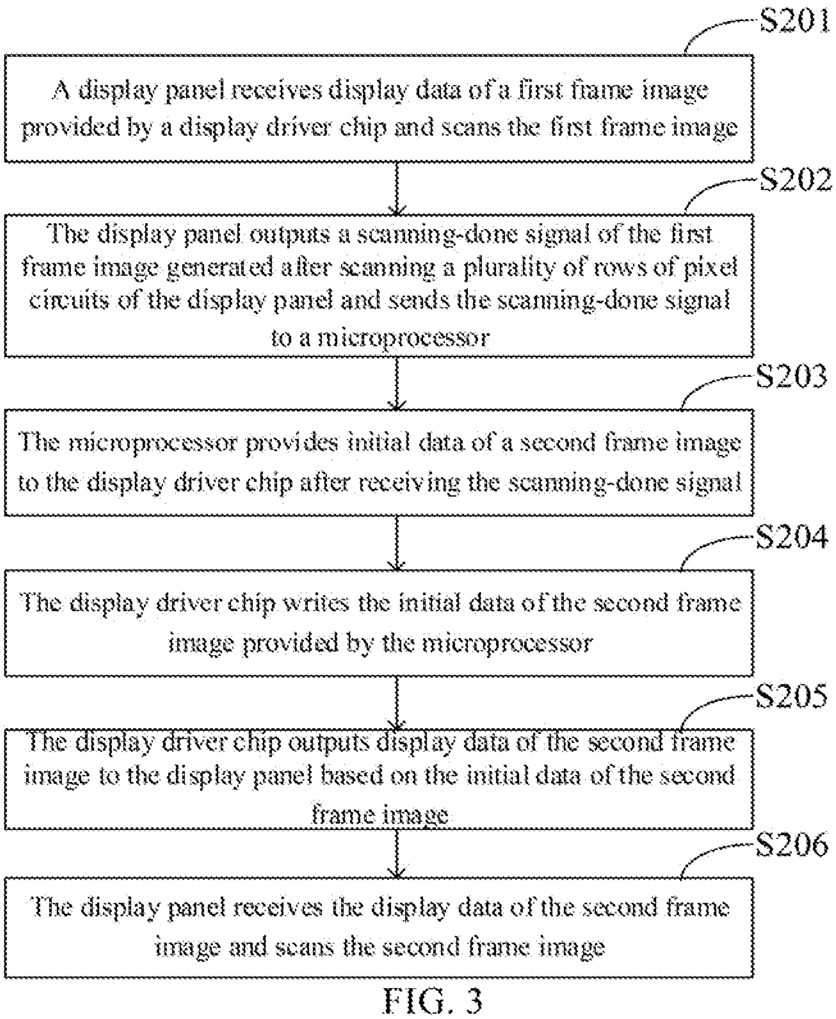
FIG. 3 is a flowchart of another display method according to an embodiment of the present disclosure.

In some embodiments, the display panel sends the output scanning-done signal SD to the microprocessor, which receives the scanning-done signal SD and provides corresponding feedback. FIG. 3 is a flowchart of another display method according to an embodiment of the present disclosure. As shown in FIG. 3, the display method includes steps S201, S202, S203, S204, S205, and S206.

At step S201, a display panel receives display data of a first frame image provided by a display driver chip and scans the first frame image.

At step S202, the display panel outputs a scanning-done signal SD of the first frame image generated after scanning multiple rows of pixel circuits of the display panel and sends the scanning-done signal SD to a microprocessor.

At step S203, the microprocessor provides initial data of a second frame image to the display driver chip after receiving the scanning-done signal SD.

At step S204, the display driver chip writes the initial data of the second frame image provided by the microprocessor.

At step S205, the display driver chip outputs display data of the second frame image to the display panel based on the initial data of the second frame image.

At step S206, the display panel receives the display data of the second frame image and scans the second frame image.

In the display method provided in this embodiment, communication is established between the display panel and the microprocessor, and the display panel provides the scanning-done signal SD of the first frame image generated after scanning multiple rows of pixel circuits of the display panel to the microprocessor, and the microprocessor receives the scanning-done signal SD and then provides the initial data of the second frame image to the display driver chip, that is, the scanning-done signal SD triggers the microprocessor to write the initial data of the image to the display driver chip. According to the display method provided in this embodiment of the present disclosure, the time period in which the display driver chip outputs the display data of the image to the display panel is separated from the time period in which the display driver chip writes the initial data of the next frame image, and the moment at which the display driver chip starts to write the initial data of the image falls in the front porch and back porch of the scanning process. When the display driver chip outputs the display data to the display panel, the signal in the RAM of the display driver chip can remain stable and is not overwritten by the initial data of the next frame image, thereby ensuring the display integrity of the frame and resolving the problem of screen tearing.

In other embodiments, the display method includes step S200 at which the display driver chip sends, at a preset frequency, a tear effect signal TE in an activated state to the microprocessor. The preset frequency is related to a display image refresh frequency of the display panel. The tear effect signal TE is the signal feedback provided by the display driver chip to the microprocessor to inform the microprocessor of the state of the display driver chip.

At step S203, the microprocessor providing the initial data of the second frame image after receiving the scanning-done signal SD includes: the microprocessor providing the initial data of the second frame image after receiving the tear effect signal in the activated state and the scanning-done signal SD.

Figure 4:
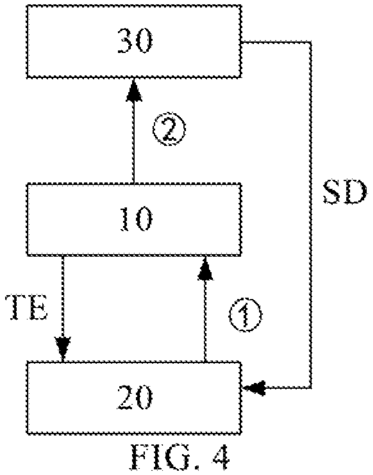
FIG. 4 is a schematic diagram of interaction between components in a display apparatus according to an embodiment of the present disclosure.

FIG. 4 is a schematic diagram of interaction between components in a display apparatus according to an embodiment of the present disclosure.

As shown in FIG. 4, the display apparatus includes a display driver chip 10, a microprocessor 20, and a display panel 30. In this implementation, a phase ① refers to a phase in which the microprocessor 20 provides initial data of an image to the display driver chip 10, and a phase ② refers to a phase in which the display driver chip 10 outputs display data of the image to the display panel 30. The display driver chip 10 provides the display data to the display panel 30 in the phase ②. At the same time, the display driver chip 10 sends, at a preset frequency, a tear effect signal TE in an activated state to the microprocessor 20. The display panel 30 receives the display data and performs an image scanning process based on the display data, and the display panel 30 generates a scanning-done signal SD based on the completion of the scanning process and sends the scanning-done signal SD to the microprocessor 20. After the microprocessor 20 receives the tear effect signal TE in the activated state and the scanning-done signal SD, it proceeds to the phase ①, that is, the tear effect signal in the activated state and the scanning-done signal SD are used as the trigger signal for triggering the phase ①. Then, the display driver chip 10 receives and caches the initial data of the image provided by the microprocessor 20 in the phase ①. When the display driver chip 10 needs to output the display data to the display panel 30, the display driver chip 10 reads the cached initial data and generates the display data. The above process is repeated to achieve continuous display of a plurality of frame images on the display panel.

Figure 5:
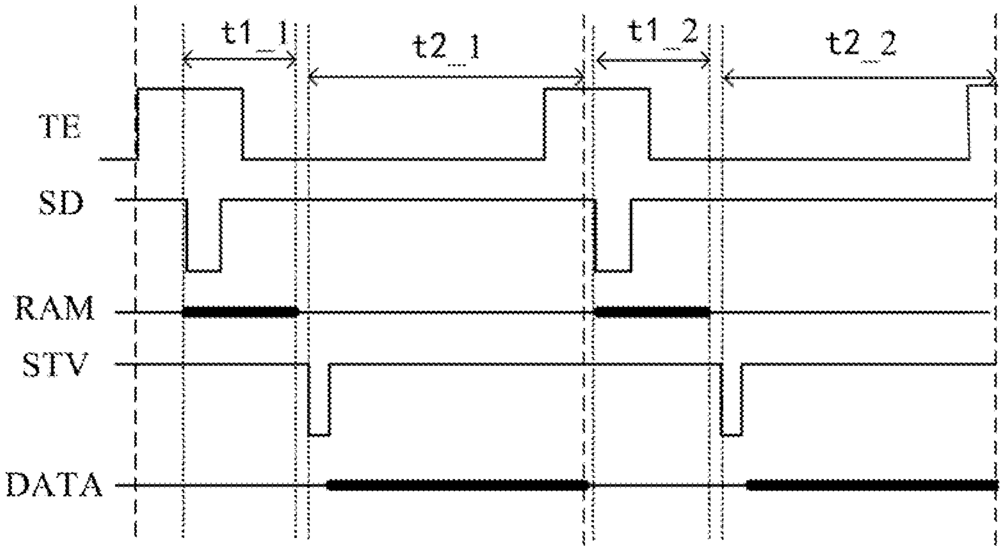
FIG. 5 is a signal timing sequence according to an embodiment of the present disclosure.

FIG. 5 is a signal timing sequence according to an embodiment of the present disclosure. The phases t1_1 and t2_1 in FIG. 5 correspond to the phase required for the display panel to display the first frame image, and the phases t1_2 and t2_2 correspond to the phase required for the display panel to display the second frame image. The process of displaying the first frame image and the second frame image successively according to the display method provided in the embodiments of the present disclosure is described with reference to FIG. 4 and FIG. 5.

When the display panel 30 needs to display the first frame image, the display driver chip 10 reads the stored initial data of the first frame image to generate the display data, and then provides the display data of the first frame image to the display panel 30 in the phase ②. The phase t2_1 in FIG. 5 is the period in which the display driver chip 10 provides the display data of the first frame image to the display panel 30. The end moment of the phase t2_1 is the moment at which the display driver chip 10 completes outputting the display data. The display data provided by the display driver chip 10 includes row scanning data and grayscale data. The row scanning data includes row scanning start data required by the shift driver circuit, which is denoted as STV. The grayscale data is denoted as DATA, and the grayscale data DATA includes a plurality of groups of row grayscale data. One group of row grayscale data corresponds to one row of pixel circuits, and the row scanning data and the grayscale data cooperate to complete the scanning process of the frame image. In FIG. 5, it is shown that the effective level of the row scanning start data STV is the low level, and the period of outputting the grayscale data DATA is indicated by bold lines. The end moment of outputting the grayscale data DATA is the end moment of outputting the display data by the display driver chip 10. FIG. 5 shows that the high level of the tear effect signal TE is the activated state and the low level is the inactivated state. As can be seen from FIG. 5, the display driver chip 10 sends, at a preset frequency, the tear effect signal TE in the activated state. The preset frequency is a preset value, and the preset frequency of the tear effect signal TE in the activated state is related to the image refresh frequency of the display panel. Ideally, the display driver chip sends the tear effect signal TE in the activated state after the end of the phase t2_1. However, due to the change of the image refresh frequency, a speed at which the display panel writes the display data is different from a speed at which the display driver chip writes the initial data. Because the display driver chip 10 cannot monitor the end moment of the phase t2_1, it cannot adjust the transmitting time of the tear effect signal TE in real time. Therefore, the end moment of the phase t2_1 shown in FIG. 5 may be later than the rising edge of the tear effect signal TE.

The low level is shown in FIG. 5 as the scanning-done signal SD, and it can be seen that the moment at which the display panel 30 starts to output the scanning-done signal SD at the low level is later than the moment at which the display driver chip 10 completes outputting the display data. The display panel 30 outputs the scanning-done signal SD after completing the scanning process of the first frame image (i.e., the display panel 30 outputs the scanning-done signal SD of the first frame image generated after scanning multiple rows of pixel circuits of the display panel), and that the display panel 30 completes the scanning process of the first frame image means that the display panel 30 completes the process of writing the display data. The display panel 30 sends the scanning-done signal SD to the microprocessor 20. In this case, the microprocessor 20 receives both the tear effect signal TE in the activated state and the scanning-done signal SD. The tear effect signal TE in the activated state is feedback provided by the display driver chip 10 to the microprocessor 20, indicating that the display driver chip 10 is ready to update the initial data. The scanning-done signal SD is feedback provided by the display panel 30 to the microprocessor 20, indicating that the display panel 30 is ready to receive the display data.

After the microprocessor 20 receives the tear effect signal TE in the activated state and the scanning-done signal SD, it proceeds to the phase ①. The microprocessor 20 provides the initial data of the second frame image to the display driver chip 10. As shown in FIG. 5, the display driver chip 10 receives and stores the initial data of the second frame image in the phase t1_2, and the time period in which the initial data is provided is indicated by bold lines in the signal RAM in FIG. 5. It can be seen that the time period corresponding to the first frame image in which the display driver chip 10 provides the grayscale data DATA does not overlap the time period corresponding to the second frame image in which the display driver chip 10 writes the RAM (that is, writes the initial data). After completing writing the initial data of the second frame image, the display driver chip 10 reads the initial data of the second frame image stored therein to generate the display data, and proceeds to the phase ② to provide the display data of the second frame image to the display panel 30. In other words, in FIG. 5, the display driver chip 10 provides the display data of the second frame image to the display panel 30 in the phase t2_2. The display panel 30 then receives the display data and performs the scanning process of the second frame image.

As can be seen from the above description, the phase t1_1 required for displaying the first frame image is a time period in which the display driver chip 10 receives and stores the initial data of the first frame image.

In the display method provided in this embodiment of the present disclosure, the display panel 30 provides feedback to the microprocessor 20 after completing the scanning process of one frame image. The display panel 30 sends the scanning-done signal SD to the microprocessor 20, and after receiving the scanning-done signal SD, the microprocessor 20 learns that the display panel 30 is ready to receive the display data of the next frame image. In addition, the microprocessor 20 receives the tear effect signal TE in the activated state sent by the display driver chip 10. After receiving the tear effect signal TE in the activated state, the microprocessor 20 learns that the display driver chip 10 is ready to receive the initial data of the next frame image. The microprocessor 20 provides the initial data of the image after receiving the tear effect signal TE in the activated state and the scanning-done signal SD. In the display method provided in this embodiment, the process in which the microprocessor 20 provides the initial data to the display driver chip 10 is controlled by the scanning-done signal SD output by the display panel 30, and the microprocessor 20 provides the initial data only after the display panel 30 and the display driver chip 10 are ready. In this way, it can be ensured that the moment at which the display driver chip 10 writes the initial data of the image falls in the front porch and back porch of the scanning process. The time period in which the display driver chip 10 outputs the display data to the display panel 30 is separated from the time period in which the display driver chip 10 writes the initial data, thereby ensuring the display integrity of the frame image and resolve the problem of screen tearing.

Figure 6:
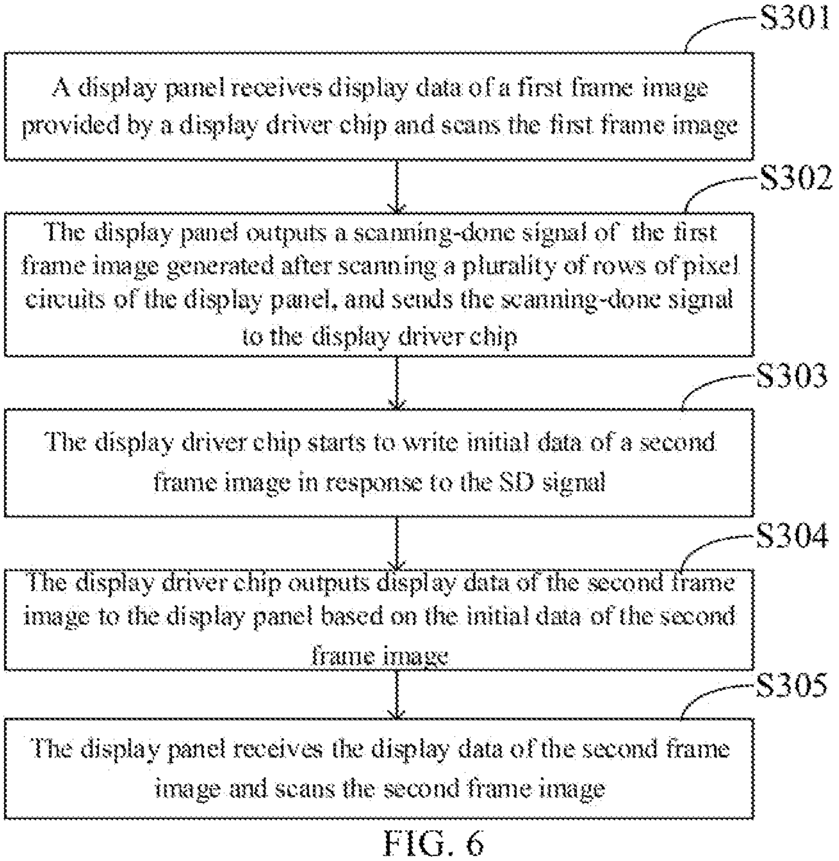
FIG. 6 is a flowchart of another display method according to an embodiment of the present disclosure.

In other embodiments, the display panel sends the output scanning-done signal to the display driver chip, and the display driver chip provides corresponding feedback after receiving the scanning-done signal. FIG. 6 is a flowchart of another display method according to an embodiment of the present disclosure. As shown in FIG. 6, the display method includes steps S301, S302, S303, S304, and S305.

At step S301, a display panel receives display data of a first frame image provided by a display driver chip and scans the first frame image.

At step S302, the display panel outputs a scanning-done signal SD of the first frame image generated after scanning multiple rows of pixel circuits of the display panel and sends the scanning-done signal SD to the display driver chip.

At step S303, the display driver chip begins to write initial data of a second frame image in response to the scanning-done signal SD.

At step S304, the display driver chip outputs display data of the second frame image to the display panel based on the initial data of the second frame image.

At step S305, the display panel receives the display data of the second frame image and scans the second frame image.

The display method provided in this embodiment achieves bidirectional communication between the display panel and the display driver chip. The display panel sends the scanning-done signal SD to the display driver chip after completing the scanning process of the first frame image, and the display driver chip starts to write the initial data of the second frame image after receiving the scanning-done signal SD, that is, the scanning-done signal SD triggers the display driver chip to write the initial data of the image. According to the display method provided in this embodiment of the present disclosure, the time period in which the display driver chip outputs the display data of the image to the display panel is separated from the time period in which the display driver chip writes the initial data of the next frame image, and the moment at which the display driver chip starts to write the initial data of the image falls in the front porch and back porch of the scanning process. When the display driver chip outputs the display data to the display panel, the signal in the RAM of the display driver chip can remain stable and is not overwritten by the initial data of the next frame image, thereby ensuring the display integrity of the frame and resolving the problem of screen tearing.

In other embodiments, the display method includes sending, by the display driver chip, a tear effect signal in an activated state at a preset frequency to the microprocessor; and providing, by the microprocessor, the initial data of the second frame image to the display driver chip in response to the tear effect signal SE in the activated state. The moment at which the microprocessor provides the initial data of the second frame image to the display driver chip is earlier than the moment at which the display driver chip receives the scanning-done signal.

Figure 7:
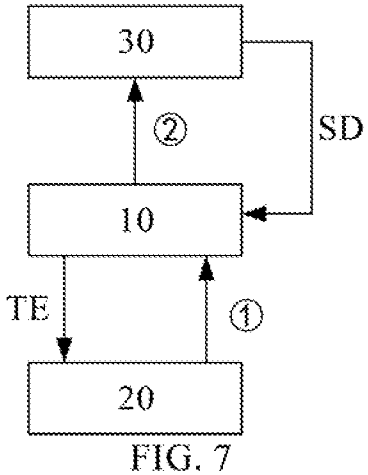
FIG. 7 is a schematic diagram of interaction between components in another display apparatus according to an embodiment of the present disclosure.

FIG. 7 is a schematic diagram of interaction between components in another display apparatus according to an embodiment of the present disclosure. For the timing diagram of the display apparatus in the embodiment of FIG. 7, refer to the schematic diagram of FIG. 5. The display method provided in this embodiment of the present disclosure is described with reference to FIG. 5 and FIG. 7. In this scheme, the phase ① refers to a phase in which a microprocessor 20 provides initial data of an image to a display driver chip 10, and the phase ② refers to a phase in which the display driver chip 10 outputs display data of the image to a display panel 30.

The display driver chip 10 provides the display data to the display panel 30 in the phase ②. At the same time, the display driver chip 10 sends, at a preset frequency, a tear effect signal TE to the microprocessor 20 to inform that the display driver chip 10 is ready. Referring to FIG. 5, the display driver chip 10 sends the tear effect signal TE in the activated state at the preset frequency.

The display panel 30 receives the display data and performs an image scanning process based on the display data, and the display panel 30 generates the scanning-done signal SE based on the completion of the scanning process and sends the scanning-done signal to the display driver chip 10. Since the display panel 30 takes a long time to write the data, the display driver chip 10 completes outputting the display data to the display panel 30 at a moment earlier than the display panel 30 completes the scanning process of the frame image, that is, the moment at which the display panel 30 starts to output the low-level scanning-done signal in FIG. 5 is later than the end moment of the phase t2_1. The end moment of the scanning process of one frame image is also the end moment of writing the display data of the frame image.

The microprocessor 20 provides the initial data of the image to the display driver chip 10 in response to the tear effect signal TE in the activated state. When successively displaying the first frame image and the second frame image, the microprocessor 20 provides, in response to the tear effect signal TE in the activated state, the initial data of the second frame image to the display driver chip 10. By setting the communication protocol between the display driver chip 10 and the microprocessor 20, the condition for the display driver chip 10 to write the initial data of the image can be set. That is, after the microprocessor 20 provides the initial data of the image to the display driver chip 10, the display driver chip 10 starts to write the initial data of the image after the condition is satisfied.

In the display method provided in this embodiment of the present disclosure, the moment at which the microprocessor 20 provides the initial data of the image to the display driver chip 10 is earlier than the moment at which the display driver chip 10 receives the scanning-done signal SD. That the display driver chip 10 receives the scanning-done signal SD is set as a trigger condition, and the display driver chip 10 starts to write the initial data of the image after receiving the effective level of the scanning-done signal SD. As can be seen from FIG. 5, the moment at which the display driver chip 10 sends the tear effect signal TE in the activated state is earlier than the moment at which the display driver chip 10 receives the effective level of the scanning-done signal SD. During the phase t1_2, the display driver chip 10 receives and stores the initial data of the second frame image. During the phase t2_2, the display driver chip 10 provides the display data of the second frame image to the display panel 30.

The display method provided in this embodiment of the present disclosure achieves bidirectional communication between the display panel 30 and the display driver chip 10, and the display panel 30 sends the scanning-done signal SD to the display driver chip 10 after scanning one frame image. Since the display panel 30 takes a long time to write the display data, the display driver chip 10 completes outputting the display data to the display panel 30 at a moment earlier than the display panel 30 completes the scanning process of the frame image, and the moment at which the display driver chip 10 sends the tear effect signal TE in the activated state to the microprocessor 20 is earlier than the moment of receiving the scanning-done signal SD. The microprocessor 20 outputs the initial data of the next frame image to the display driver chip 10 after receiving the tear effect signal TE in the activated state. In this case, the display driver chip 10 waits for the trigger of the scanning-done signal SD, and starts, after receiving the scanning-done signal SD, writing the initial data of the image provided by the microprocessor 20. In the display method provided in this embodiment, the process in which the display driver chip 10 writes the initial data is controlled by the display panel 30. The display driver chip 10 starts to write the initial data provided by the microprocessor 20 only after the display panel 30 is ready. In this way, it can be ensured that the moment at which the display driver chip 10 writes the initial data of the image falls in the front porch and back porch of the scanning process. The time period in which the display panel 30 writes the display data is separated in the time sequence from the time period in which the display driver chip 10 writes the initial data corresponding to the next frame image, thereby ensuring the display integrity of the frame image and resolving the problem of screen tearing.

Figure 8:
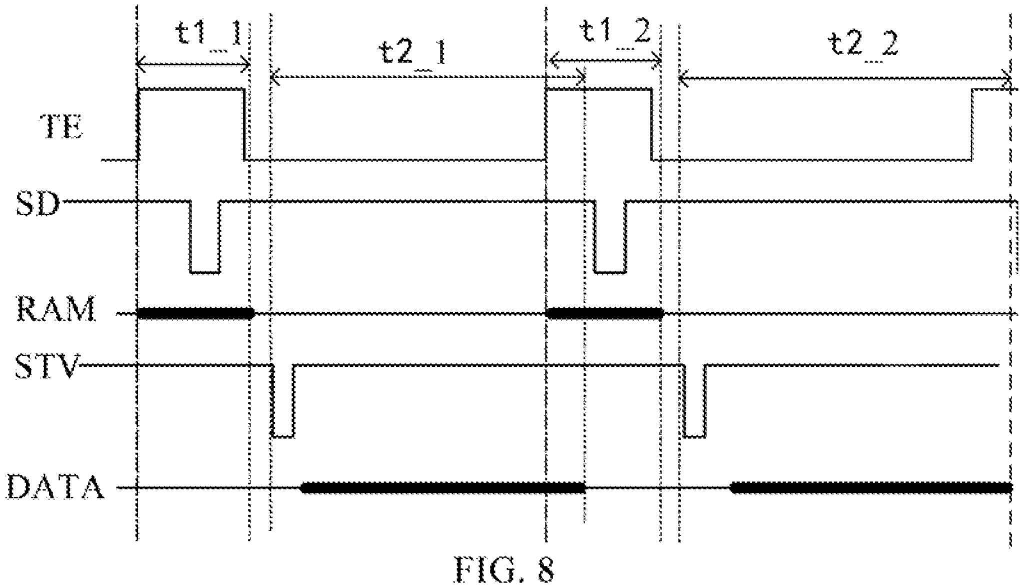
FIG. 8 is a signal timing sequence according to an embodiment of the present disclosure.

In other embodiments, the display panel sends the output scanning-done signal to the display driver chip, and the display driver chip provides corresponding feedback after receiving the scanning-done signal. FIG. 8 is a signal timing sequence according to an embodiment of the present disclosure. The process of displaying the first frame image and the second frame image successively according to the display method provided in this embodiment of the present disclosure is described with reference to FIG. 8 and FIG. 7. In FIG. 8, the phases t1_1 and t1_2 indicate the period in which the display driver chip 10 writes the initial data of the image, and the phases t2_1 and t2_2 indicate the period in which the display driver chip 10 provides the display data of the image to the display panel 30. The phases t1_1 and t2_1 in FIG. 8 correspond to the phase required for the display panel to display the first frame image, and the phases t1_2 and t2_2 correspond to the phase required for the display panel to display the second frame image.

As shown in FIG. 8, in the phase t2_1, the display driver chip 10 provides the display data of the first frame image to the display panel 30. The display data includes row scanning start data STV and grayscale data DATA. In addition, the display driver chip 10 also sends, at a preset frequency, the tear effect signal in the activated state to the microprocessor 20.

The microprocessor 20 provides the initial data of the second frame image to the display driver chip 10 after receiving the tear effect signal in the activated state, and the phase t1_2 is the period in which the display driver chip 10 writes the initial data of the second frame image. That is, after the microprocessor 20 provides the initial data of the image to the display driver chip 10, the display driver chip 10 immediately starts to write the initial data, and other trigger conditions are not needed for the display driver chip 10 to write the initial data of the image. It can be seen from FIG. 8 that the display driver chip 10 has started to write the initial data of the second frame image before the end of the phase t2_1. There is only one access memory in the conventional display driver chip, but two memories can be set in the display panel using the display method provided in the embodiments of the present disclosure. The first memory and the second memory alternately store the initial data of the image. For example, the first memory stores the initial data of the first frame image, and the initial data in the first memory is read to generate the display data of the first frame image, which is provided to the display panel. When the display driver chip provides the display data of the first frame image to the display panel, the second memory starts to cache the initial data of the second frame image. The second memory and the first memory are independent of each other, such that the data in the first memory can be kept stable in the process of providing the display data of the first frame image to the display panel.

The display panel 30 sends the scanning-done signal SD of the first frame image generated after scanning multiple rows of pixel circuits of the display panel, to the display driver chip 10, and it can be seen from FIG. 8 that the moment at which the display driver chip 10 receives the scanning-done signal SD is later than the moment at which the display driver chip 10 outputs the display data of the first frame image. An initial moment at which the display driver chip 10 writes the initial data of the second frame image is earlier than the moment at which the display driver chip 10 receives the scanning-done signal SD. The display driver chip 10 outputs, in response to the scanning-done signal SD, the display data of the second frame image to the display panel 30 in the phase t2_2.

The display method provided in this embodiment achieves bidirectional communication between the display panel 30 and the display driver chip 10. The display panel 30 sends the scanning-done signal SD to the display driver chip 10 after completing the scanning process of the first frame image, and the display driver chip 10 outputs, in response to the scanning-done signal SD, the display data of the second frame image to the display panel 30, that is, the scanning-done signal SD triggers the display driver chip 10 to output the display data of the image. The display driver chip 10 starts to wait for the scanning-done signal SD after writing the initial data of the image, and then outputs the display data to the display panel 30 after receiving an effective level of the scanning-done signal SD. According to the display method provided in this embodiment of the present disclosure, the scanning-done signal SD output by the display panel 30 triggers the display driver chip 10 to output the display data of the image, such that the display driver chip 10 outputs the display data of the image to the display panel 30 after the display panel 30 completes the scanning process of one frame image. In other words, the display panel 30 starts to receive the display data of the next frame only after the display panel 30 completes the scanning process of the frame image, thereby ensuring the display integrity of the frame image and resolving the problem of screen tearing.

In some embodiments, with reference to the timing diagram of FIG. 8, the phase t1_2 is a time period in which the display driver chip 10 writes the initial data of the second frame image, the phase t2_2 is a time period in which the display driver chip 10 outputs the display data of the second frame image to the display panel 30, and there is a partial overlap between the phase t1_2 and the phase t2_1. In the display method provided in this embodiment of the present disclosure, the scanning-done signal SD output by the display panel 30 is sent to the display driver chip 10, and the display driver chip 10 outputs the display data of the second frame image to the display panel 10 after receiving the scanning-done signal SD and after writing of the initial data of the second frame image is completed, such that the time period in which the display driver chip 10 outputs the display data of the image to the display panel 30 occurs after the display panel 30 completes the scanning process of one frame image, and the display driver chip 10 starts to output the display data of the frame image only after the initial data of the image has been completely written. During application, the display driver chip 10 is provided with two access memories. When the display driver chip 10 reads the data in one of the access memories to output the display data to the display panel 30, the initial data of the next frame image is stored in the other access memory. Therefore, the stability of the signal read by the display driver chip 10 from the access memory while providing the display data can be ensured. It can be ensured that the display panel 30 does not start to receive the display data of the next frame image until the scanning process of one frame image is completed, thereby ensuring the display integrity of the frame image and resolving the problem of screen tearing.

In some embodiments, with reference to FIG. 5, the high-level signal is the tear effect signal TE in the activated state and the low-level signal is the scanning-done signal SD, and the moment at which the microprocessor 20 receives the tear effect signal TE in the activated state is earlier than the moment at which the display driver chip or the microprocessor receives the scanning-done signal SD.

In the scheme that the microprocessor 20 receives the scanning-done signal SD, the microprocessor 20 first receives the tear effect signal TE in the activated state and then receives the scanning-done signal SD, thereby triggering the microprocessor 20 to output the initial data of the image to the display driver chip 10. In this implementation, the display driver chip 10 sends, at a preset frequency, the tear effect signal TE in the activated state to the microprocessor 20, to inform the microprocessor 20 that the display driver chip 10 is ready. The microprocessor 20 starts to wait for the scanning-done signal SD after receiving the tear effect signal TE in the activated state, and after receiving the scanning-done signal SD, triggers the process of providing the initial data to the display driver chip 10.

In the scheme that the display driver chip 10 receives the scanning-done signal SD, the display driver chip 10 sends, at a preset frequency, the tear effect signal TE in the activated state to the microprocessor 20, the microprocessor 20 sends, in response to the tear effect signal TE in the activated state, the initial data of the image to the display driver chip 10, and the display driver chip 10 starts to receive and write the initial data of the image only after receiving the scanning-done signal SD. In this embodiment, the scanning-done signal SD triggers the display driver chip 10 to write the initial data of the image, the moment at which the microprocessor 20 receives the tear effect signal TE in the activated state is earlier than the moment at which the display driver chip receives the scanning-done signal SD, and the frequency at which the display driver chip 10 sends the tear effect signal TE can be left unchanged.

In some embodiments, with reference to FIG. 5, a period of an effective level (that is, the low level period) of the scanning-done signal SD at least partially overlaps a lasting period of the tear effect signal TE in the activated state. In other words, the end moment of the tear effect signal TE in the activated state is later than the moment of the effective level of the scanning-done signal SD. It ensures that the display driver chip 10 can normally receive and cache the initial data when the microprocessor 20 provides the initial data to the display driver chip 10.

In the scheme that the microprocessor 20 receives the scanning-done signal SD, the period of the effective level of the scanning-done signal SD at least partially overlaps the lasting period of the tear effect signal TE in the activated state. In this way, after the microprocessor 20 receives the effective level of the scanning-done signal SD, the tear effect signal TE becomes inactive at a certain moment, ensuring the display driver chip 10 to normally receive and cache the initial data when the microprocessor 20 provides the initial data to the display driver chip 10.

In some implementations, the end moment of the tear effect signal TE in the activated state is later than the end moment of the effective level of the scanning-done signal SD.

In some implementations, the display data output by the display driver chip includes row scanning data and grayscale data. With reference to FIG. 5 or FIG. 8, the row scanning data includes row scanning start data STV, and the grayscale data DATA includes row grayscale data. The scanning start data STV is used for controlling the operation of the shift driver circuit, the shift driver circuit controls scanning of a plurality of rows of pixel circuits in the display panel row by row, and the row grayscale data corresponds to one row of pixel circuits. When one row of pixel circuits is scanned, the row grayscale data is input to the row of pixel circuits, to cause a plurality of sub-pixels controlled by the row of pixel circuits to emit light. In the display method provided in this embodiment of the present disclosure, said outputting the display data of the second frame image to the display panel at step S102 includes: outputting the row scanning start data and the row grayscale data to the display panel; and the display method includes step S103 where the display driver chip sends, at a preset frequency, the tear effect signal in the activated state to the microprocessor. The display driver chip communicates with the microprocessor to inform the state of the display driver chip by transmitting the tear effect signal TE in the activated state to the microprocessor. The microprocessor outputs the initial data of the image to the display driver chip in response to the tear effect signal TE in the activated state.

In some implementations, during the process of displaying one frame image, the moment at which writing the row grayscale data to the last row of pixel circuits in the display panel is completed is denoted as the moment at which the display panel completes the scanning process of one frame image. As shown in FIG. 5, the phase t2_1 indicates a time period in which the display driver chip provides the display data to the display panel, and the end moment at which the display panel completes the scanning process of a frame based on the display data is later than the moment at which the display driver chip completes providing the display data. The duration of the tear effect signal TE in the activated state in this embodiment of the present disclosure at least partially overlaps the period of the effective level of the scanning-done signal SD. In other words, the period of writing the row grayscale data into the last row of pixel circuits in the display panel partially overlaps with the duration of the tear effect signal TE in the activated state, and the moment of completing writing the row grayscale data into the last row of pixel circuits in the display panel is earlier than the end time of the tear effect signal TE in the activated state. In the display method provided in this embodiment, the display driver chip sends, at the preset frequency, the tear effect signal TE in the activated state to the microprocessor, to inform the microprocessor that the display driver chip is ready. The duration of the tear effect signal TE in the activated state overlaps the period of writing the row grayscale data into the last row of pixel circuits in the display panel. In the overlapping period, since the display panel has not output the scanning-done signal SD, the display driver chip has not started to write the initial data of the next frame image. In this case, the overlapping period does not cause display screen tearing. The scanning-done signal SD is not output until the row grayscale data is written into the last row of pixel circuits in the display panel, and the moment of completing writing the row grayscale data into the last row of pixel circuits is set earlier than the end moment of the tear effect signal TE in the activated state, so as to ensure that the tear effect signal TE is still in the activated state when the display driver chip or the microprocessor receives the scanning-done signal SD. Therefore, it can be ensured that the display driver chip starts to write the initial data of the image after the display panel outputs the scanning-done signal SD, such that the time period in which the display driver chip outputs the display data of the image to the display panel is separated in time sequence from the time period in which the display driver chip writes the initial data of the next frame image, thus ensuring the display integrity of the frame image and resolving the problem of screen tearing.

In some embodiments, the display panel includes row scanning lines and a shift driver circuit, one row scanning line drives one row of pixel circuits, the shift driver circuit includes a plurality of cascaded shift registers, and an output terminal of the shift register is coupled to the row scanning line. The shift registers may be of any one of the structures in the related art and is not schematically illustrated herein. In the display method provided in this embodiment of the present disclosure, the step S101 where the display panel outputs the scanning-done signal SD of the first frame image generated after scanning the multiple rows of pixel circuits of the display panel includes: The display panel outputs the scanning-done signal SD based on an enable signal output from a last-stage shift register in the shift driver circuit. During the scanning process of the display panel, the enable signal output by the last-stage shift register cooperates with the row grayscale data to drive the last row of pixel circuits, so as to drive the sub-pixels controlled by the last row of pixel circuits to emit light. The scanning process of the frame image is completed. In this implementation, the scanning-done signal SD is output based on the enable signal output from the last-stage shift register, which can accurately indicate that the display panel has completed the scanning process of one frame image and provide feedback.

Figure 9:
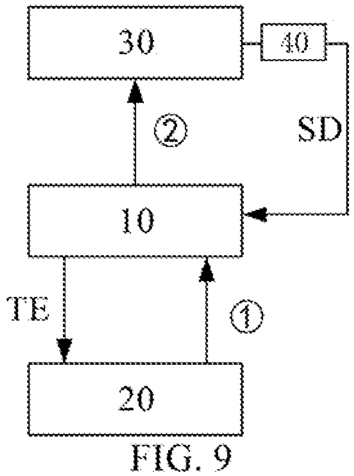
FIG. 9 is a schematic diagram of another display apparatus according to an embodiment of the present disclosure.

In some embodiments, FIG. 9 is a schematic diagram of another display apparatus according to an embodiment of the present disclosure. As shown in FIG. 9, the display apparatus includes a conversion circuit 40, and an input terminal of the conversion circuit 40 is electrically connected to an output terminal of the last-stage shift register. The conversion circuit 40 is configured to convert a signal input via the input terminal into a logic level that matches the display driver chip 10 or the microprocessor 20. FIG. 9 only shows that the conversion circuit 40 sends the scanning-done signal SD to the display driver chip 10. In the display method provided in this embodiment of the present disclosure, said outputting the scanning-done signal SD based on the enable signal output by the last-stage shift register in the shift driver circuit includes: after receiving, via the input terminal, the enable signal output by the last-stage shift register, the conversion circuit 40 converting the enable signal into the scanning-done signal SD and outputs the scanning-done signal SD. According to the display method provided in this embodiment of the present disclosure, the conversion circuit 40 converts the enable signal output by the last-stage shift register in the display panel 30, such that the logic level of the converted scanning-done signal SD matches the display driver chip 10 or the microprocessor 20, thereby ensuring that the display driver chip 10 or the microprocessor 20 can provide corresponding feedback in response to the scanning-done signal.

Figure 10:
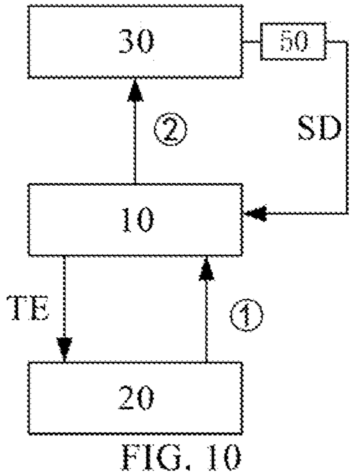
FIG. 10 is a schematic diagram of another display apparatus according to an embodiment of the present disclosure.

In other embodiments, FIG. 10 is a schematic diagram of another display apparatus according to an embodiment of the present disclosure. As shown in FIG. 10, the display apparatus includes a voltage regulator circuit 50, and the voltage regulator circuit 50 is configured to adjust a voltage of a signal input via an input terminal, to a voltage matching the display driver chip 10 or the microprocessor 20. FIG. 10 only shows that the voltage regulator circuit 50 sends the adjusted scanning-done signal SD to the display driver chip 10. In the display method provided in the embodiments of the present disclosure, that the display panel 10 outputs the scanning-done signal SD of the first frame image generated after scanning multiple rows of pixel circuits of the display panel includes: The display panel 10 provides the scanning-done signal SD to the voltage regulator circuit 50, and the voltage regulator circuit 50 adjusts the magnitude of the voltage of the scanning-done signal SD and outputs the scanning-done signal SD. After being adjusted by the voltage regulator circuit 50, the signal logic of the scanning-done signal SD remains unchanged, and only the voltage is changed. In the display method provided in the embodiments of the present disclosure, the voltage regulator circuit 50 is configured to adjust the voltage of the scanning-done signal SD, such that the adjusted voltage of the scanning-done signal SD matches the display driver chip 10 or the microprocessor 20, thereby ensuring that the display driver chip 10 or the microprocessor 20 can provide corresponding feedback in response to the scanning-done signal SD.

Figure 11:
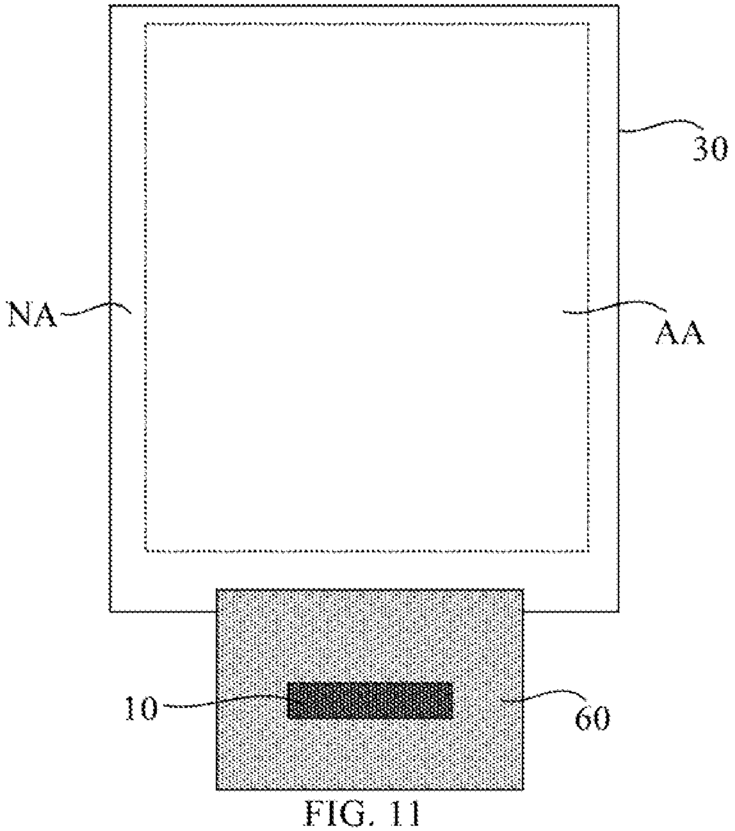
FIG. 11 is a schematic diagram of a display apparatus according to an embodiment of the present disclosure.

An embodiment of the present disclosure further provides a display apparatus achieving display by using the display method according to the embodiments of the present disclosure. FIG. 11 is a schematic diagram of a display apparatus according to an embodiment of the present disclosure. As shown in FIG. 11, the display apparatus includes a display panel 30, a display driver chip 10, and a microprocessor (not shown in FIG. 11). The display panel 30 has a display area AA and a non-display area NA, a flexible printed circuit board 60 is bound to the non-display area NA, and the display driver chip 10 is fixed on the flexible printed circuit board 60, that is, the display driver chip 10 is coupled to the display panel 30 through wires on the flexible printed circuit board 60. The flexible printed circuit board 60 is coupled to the microprocessor. In other embodiments, the display driver chip 10 is directly fixed in the non-display area NA of the display panel 30, which is not illustrated herein.

The working processes of the display panel 30, the display driver chip 10, and the microprocessor in the display apparatus can be understood with reference to the above embodiments of the display method. In the display apparatus provided in this embodiment of the present disclosure, the display panel 30 is configured to output a scanning-done signal SD of a first frame image generated after scanning multiple rows of pixel circuits of the display panel, and the display panel 30 sends the scanning-done signal SD to the display driver chip 10 or the microprocessor. The display driver chip 10 is configured to start to write initial data of a second frame image after the microprocessor or the display driver chip 10 receives the scanning-done signal SD, and output display data of the second frame image to the display panel 10 based on the initial data. Alternatively, the display driver chip 30 outputs, in response to the scanning-done signal SD, the display data of the second frame image to the display panel 10, and the display data is generated based on the initial data. The second frame image is a next frame image of the first frame image.

In the display apparatus provided in this embodiment of the present disclosure, after the scanning process of the first frame image (multiple rows of pixel circuits of the display panel are scanned) is completed, the display panel provides feedback and outputs the scanning-done signal SD. That the display panel outputs the scanning-done signal SD means that the display panel is ready to receive the display data of the next frame image. After the display panel outputs the feedback signal, that is, the scanning-done signal SD, the display driver chip writes the initial data of the second frame image provided by the microprocessor or outputs the display data of the second frame image to the display panel in response to the scanning-done signal SD. When the display panel needs to display the first frame image and the second frame image successively, the display panel outputs the scanning-done signal SD to actively provide feedback on scanning completion of the first frame image. The display driver chip outputs the display data of the second frame image to the display panel after the display panel outputs the scanning-done signal SD, such that the display driver chip does not provide the display data of the next frame to the display panel before the data writing process of the current frame is completed, thereby ensuring the display integrity of the frame images and avoiding screen tearing.

Figure 12:
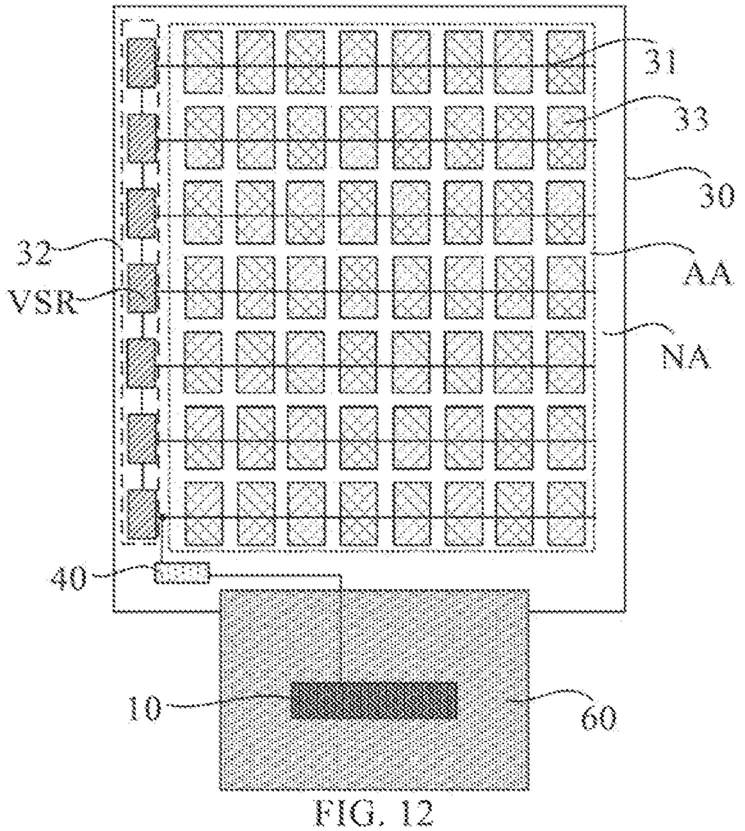
FIG. 12 is a schematic diagram of another display apparatus according to an embodiment of the present disclosure.

In some embodiments, FIG. 12 is a schematic diagram of another display apparatus according to an embodiment of the present disclosure. As shown in FIG. 12, the display panel 30 includes row scanning lines 31 and a shift driver circuit 32. Each row scanning line 31 drives one row of pixel circuits, and one row of pixel circuits includes a plurality of pixel circuits 33. The shift driver circuit 32 includes a plurality of cascaded shift registers VSR, and an output terminal of the shift register VSR is coupled to the row scanning line 31. FIG. 12 shows the shift driver circuit 32 only provided at one side of the display area AA, with a terminal of one row scanning line 31 coupled to one shift register VSR. In other embodiments, the shift driver circuits 32 are provided at two sides of the display area AA, and two terminals of one row scanning line 31 are respectively connected to one shift register VSR, which is not illustrated herein.

As shown in FIG. 12, the display panel 30 includes a conversion circuit 40, and an input terminal of the conversion circuit 40 is electrically connected to an output terminal of the last-stage shift register VSR in the shift driver circuit 32. The display panel 30 is configured to output a scanning-done signal based on an enable signal output by the last-stage shift register VSR in the shift driver circuit 32. The conversion circuit 40 is configured to receive the enable signal from the last-stage shift register VSR, converts the enable signal into the scanning-done signal, and outputs the scanning-done signal. In FIG. 12, the conversion circuit 40 is shown connected to the display driver chip 10. After converting the enable signal into the scanning-done signal, the conversion circuit 40 sends the scanning-done signal to the display driver chip 10. After the conversion circuit 40 performs its function, the logic level of the scanning-done signal can match the display driver chip 10.

In other embodiments, the conversion circuit 40 is coupled to the microprocessor in the display apparatus through wires on the flexible printed circuit board, and the conversion circuit 40 converts the enable signal into the scanning-done signal and sends the scanning-done signal to the microprocessor.

The conversion circuit 40 converts the enable signal output by the last-stage shift register in the display panel 30, such that the logic level of the converted signal matches the display driver chip 10 or the microprocessor in the display apparatus, thereby ensuring that the display driver chip 10 or the microprocessor can provide corresponding feedback in response to the scanning-done signal.

Figure 13:
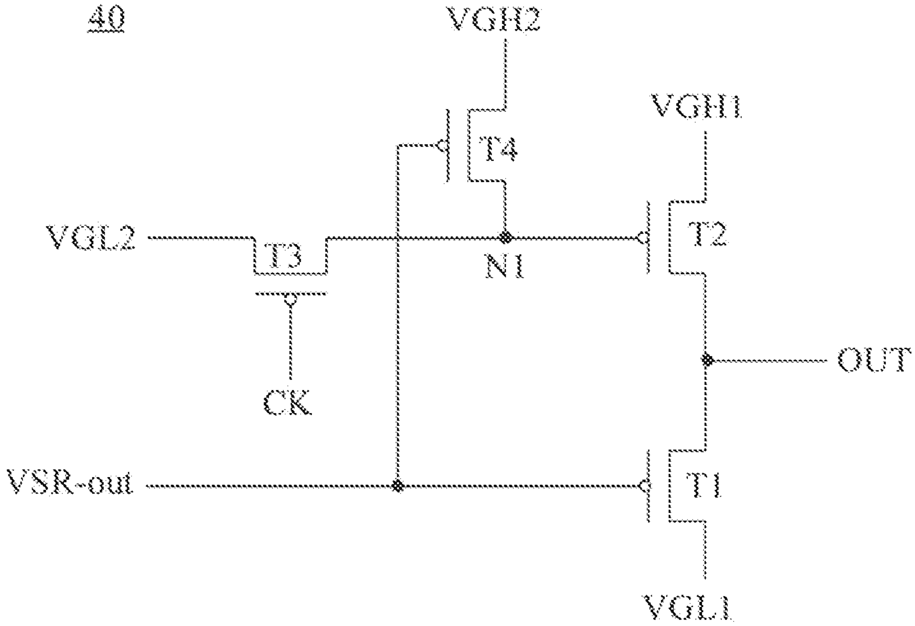
FIG. 13 is a schematic diagram of a conversion circuit according to an embodiment of the present disclosure.

In some embodiments, FIG. 13 is a schematic diagram of a conversion circuit according to an embodiment of the present disclosure. As shown in FIG. 13, the conversion circuit 40 includes a first transistor T1, a second transistor T2, a third transistor T3, and a fourth transistor T4. The first transistor T1 includes a control terminal electrically connected to an output terminal VSR-out of the shift register VSR at the last phase, a first electrode receiving a first low-level signal VGL1, and a second electrode electrically connected to an output terminal OUT of the conversion circuit 40. The second transistor T2 includes a control terminal connected to a first node N1, a first electrode receiving a first high-level signal VGH1, and a second electrode electrically connected to the output terminal OUT of the conversion circuit 40. A voltage of the first high-level signal VGH1 is greater than a voltage of the first low-level signal VGL1. The third transistor T3 includes a control terminal receiving a first control signal CK, a first electrode receiving a second low-level signal VGL2, and a second electrode connected to the first node N1. The fourth transistor T4 includes a control terminal electrically connected to the output terminal VSR-out of the last-stage shift register, a first electrode receiving a second high-level signal VGH2, and a second electrode connected to the first node N1. A voltage of the second high-level signal VGH2 is greater than a voltage of the second low-level signal VGL2.

In FIG. 13, each transistor is illustrated as a P-type transistor. In other embodiments, each transistor in the conversion circuit 40 may be an N-type transistor, which is not illustrated herein.

For example, the low-level signal output by the output terminal VSR-out of the last-stage shift register is the enable signal. When the output terminal VSR-out outputs a low-level signal, the first transistor T1 and the fourth transistor T4 are turned on. After the first transistor T1 is turned on, the first low-level signal VGL1 is supplied to the output terminal OUT. After the second transistor T2 is turned on, the second high-level signal VGH2 is written to the first node N1, and the high level of the first node N1 controls the second transistor T2 to turn off. In this case, the output terminal OUT outputs a low-level signal of the first low-level signal VGL1. When the output terminal VSR-out outputs a high-level signal, the first transistor T1 and the fourth transistor T4 are turned off. In this case, the first control signal CK is used to control the third transistor T3 to turn on, the second low-level signal VGL2 is written into the first node N1, and the low level of the first node N1 controls the second transistor T2 to turn on. In this case, the output terminal OUT outputs a high-level signal of the first high-level signal VGH1. In this embodiment, the low-level signal of the first low-level signal VGL1 output from the output terminal OUT may be used as the scanning-done signal output by the display panel.

In some embodiments, the display panel 30 includes a pixel circuit, a light-emitting element, a first power supply line, a second power supply line, and a reset signal line. The first power supply line provides a first power supply signal, the second power supply line provides a second power supply signal, and the reset signal line provides a reset signal; and the pixel circuit includes an input terminal coupled to the first power supply line, another input terminal coupled to the reset signal line, and an output terminal coupled to a first electrode of the light-emitting element, and a second electrode of the light-emitting element is coupled to the second power supply line. This embodiment of the present disclosure does not limit the specific structure of the pixel circuit, and the pixel circuit may be of any structure in the related art. The light-emitting element is an organic light-emitting element or an inorganic light-emitting element. The first power supply line and the reset signal line are signal lines needed to drive the pixel circuit to work. The voltage of the first power supply signal is greater than the voltage of the second power supply signal.

The display panel 30 includes a shift driver circuit (referring to the schematic diagram in FIG. 12) including drive signal lines and cascaded shift registers. The drive signal lines includes a third power supply line and a fourth power supply line, the third power supply line provides a third power supply signal, and the fourth power supply line provides a fourth power supply signal. A voltage of the third power supply signal is greater than a voltage of the fourth power supply signal. The shift register is coupled to the third power supply line and the fourth power supply line.

One of the first power supply signal and the third power supply signal is reused as the first high-level signal VGH1; one of the first power supply signal and the third power supply signal is reused as the second high-level signal VGH2; one of the second power supply signal, the fourth power supply signal, and the reset signal is reused as the first low-level signal VGL1; and one of the second power supply signal, the fourth power supply signal, and the reset signals is reused as the second low-level signal VGL2. The voltage of the first high-level signal VGH1 may be equal or unequal to the voltage of the second high-level signal VGH2, and the voltage of the first low-level signal VGL1 may be equal or unequal to the voltage of the second low-level signal VGL2. In this embodiment, the original signal in the display panel is used to drive the conversion circuit 40 to work, which can reduce wiring space in the display panel 30. The operation of the conversion circuit 40 does not need the display driver chip to provide additional signal support.

The first high-level signal VGH1, the second high-level signal VGH2, the first low-level signal VGL1, and the second low-level signal VGL2 may be other signals in the display panel. Details will not be repeated herein.

In some embodiments, the first control signal CK of the conversion circuit 40 is a periodic pulse signal, and the drive signal lines in the shift driver circuit include a clock signal line, and a clock signal provided by the clock signal line is reused as the first control signal CK.

Figure 14:
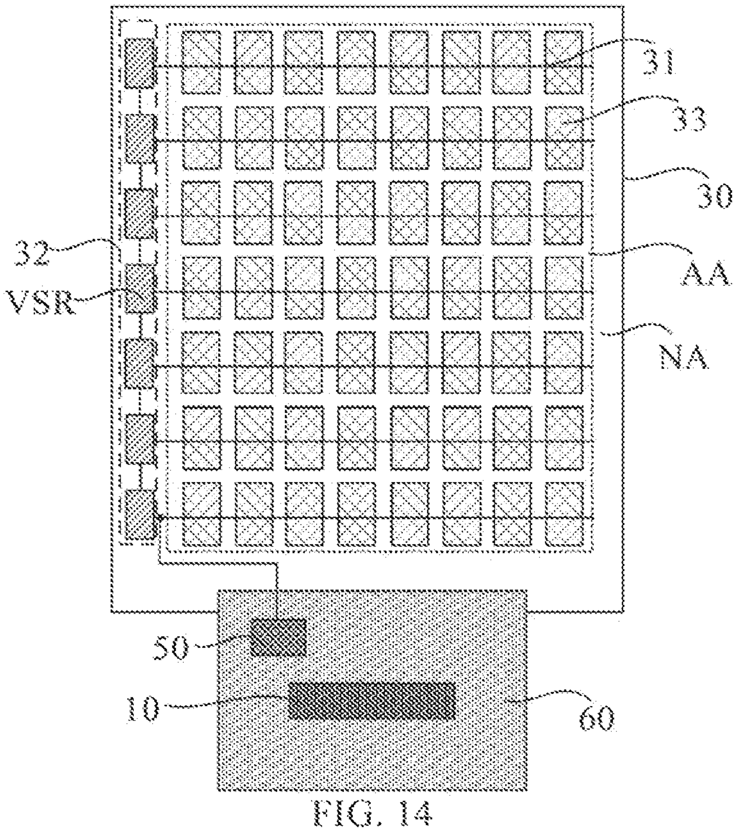
FIG. 14 is a schematic diagram of another display apparatus according to an embodiment of the present disclosure.

FIG. 14 is a schematic diagram of another display apparatus according to an embodiment of the present disclosure. In other embodiments, as shown in FIG. 14, the display panel 30 includes row scanning lines 31 and a shift driver circuit 32. One row scanning line 31 is configured to drive one row of pixel circuits, and one row of pixel circuits includes pixel circuits 33. The shift driver circuit 32 includes cascaded shift registers VSR, and output terminals of the shift registers VSR are coupled to the row scanning lines 31. FIG. 14 shows the shift driver circuit 32 provided at only one side of the display area AA, with a terminal of one row scanning line 31 coupled to one shift register VSR. In other embodiments, the shift driver circuits 32 are provided at two sides of the display area AA, and two terminals of one row scanning line 31 are connected to one shift register VSR, which is not shown in figures.

As shown in FIG. 14, the display apparatus can include a voltage regulator circuit 50 coupled to the display panel 30, and the voltage regulator circuit 50 is connected to the output terminal of the last-stage shift register VSR in the shift driver circuit 32. The display panel 30 is configured to output the scanning-done signal based on an enable signal output by the last-stage shift register VSR in the shift driver circuit 32, and the voltage regulator circuit 50 is configured to adjust a magnitude of a voltage of the scanning-done signal and output the scanning-done signal.

In some embodiments, the voltage regulator circuit 50 transmits the adjusted scanning-done signal to the display driver chip 10. In some embodiments, the voltage regulator circuit 50 transmits the adjusted scanning-done signal to the microprocessor.

After being adjusted by the voltage regulator circuit 50, the signal logic of the scanning-done signal remains unchanged, and only its voltage is changed. The voltage regulator circuit 50 is configured to adjust the voltage of the scanning-done signal, such that the voltage of the adjusted scanning-done signal matches a circuit receiving the scanning-done signal, and this circuit can provide corresponding feedback in response to the scanning-done signal.

The embodiments of the present disclosure do not limit the specific structure of the voltage regulator circuit 50, and the voltage regulator circuit 50 may be of any circuit structure in the related art that only changes the voltage without changing the signal logic.

In some embodiments, as shown in FIG. 14, the display panel 30 is coupled to the display driver chip 10 via a flexible printed circuit board 60, and the voltage regulator circuit 50 is disposed on the flexible printed circuit board 60. The space on the flexible printed circuit board 60 is relatively large, and the wiring on the flexible printed circuit board 60 will not be affected by arranging the voltage regulator circuit 50 on the flexible printed circuit board 60. The coupling between the voltage regulator circuit 50 and the display driver chip 10 or the coupling between the voltage regulator circuit 50 and the microprocessor can be easily realized.

Figure 15:
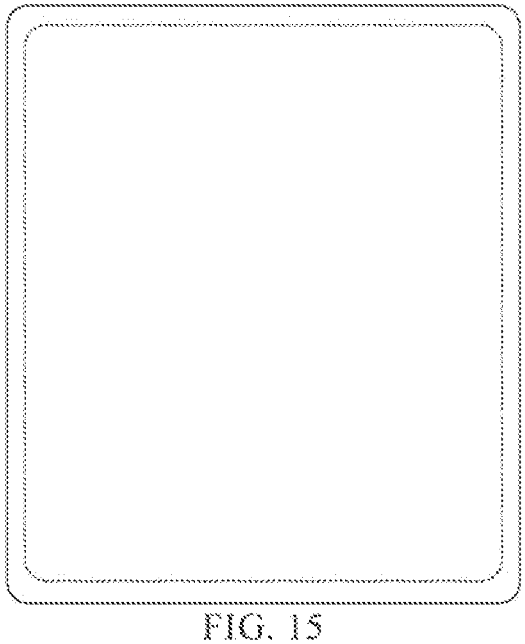
FIG. 15 is a schematic diagram of a display apparatus according to an embodiment of the present disclosure.

An embodiment of the present disclosure provides a display apparatus. FIG. 15 is a schematic diagram of the display apparatus according to an embodiment of the present disclosure, and the display apparatus includes a display panel, a display driver chip, and a microprocessor. The display apparatus achieves display by using the display method according to any embodiment of the present disclosure. The display method has been described in the foregoing embodiments, and details will not be repeated herein. The display apparatus provided in the embodiment of the present disclosure may be, for example, an electronic device such as a mobile phone, a computer, a tablet, a television, or a smart wearable product.

The above description illustrates merely examples of the present disclosure and are not intended to limit the present disclosure. Any modifications, equivalent replacements, improvements, and the like made within the principle of the present disclosure shall fall within the scope of the present disclosure.

Finally, it should be noted that the foregoing embodiments are merely intended to describe and not to limit the technical solutions of the present disclosure. Although the present disclosure has been described in detail with reference to the foregoing embodiments, persons skilled in the art should understand that they can still make modifications to the technical solutions described in the foregoing embodiments or make equivalent replacements to some or all of the technical features thereof. These modifications or replacements do not make the essence of the corresponding technical solutions deviate from the scope of the technical solutions of the embodiments of the present disclosure.

What is claimed is:

1. A display method, wherein the display method is applied to a display apparatus comprising a display panel, a display driver chip, and a microprocessor;

wherein the display method comprises:

outputting, by the display panel, a scanning-done signal of a first frame image generated after scanning a plurality of rows of pixel circuits of the display panel, wherein the scanning-done signal indicates that the display panel completes a data writing process of a frame image;

after the microprocessor or the display driver chip receives the scanning-done signal, writing, by the display driver chip, initial data of a second frame image provided by the microprocessor and outputting, by the display driver chip, display data of the second frame image to the display panel based on the initial data; or outputting, by the display driver chip, the display data of the second frame image to the display panel in response to the scanning-done signal, the display data being generated based on the initial data provided by the microprocessor;

wherein the second frame image follows the first frame image; and transmitting, by the display driver chip, a tear effect signal in an activated state to the microprocessor at a preset frequency, wherein a moment at which the microprocessor receives the tear effect signal in the activated state is earlier than a moment at which the microprocessor or the display driver chip receives the scanning-done signal.

2. The display method according to claim 1, wherein said outputting, by the display panel, the scanning-done signal of the first frame image generated after scanning the plurality of rows of pixel circuits of the display panel comprises: transmitting, by the display panel, the scanning-done signal to the microprocessor; and wherein the display method further comprises:

providing, by the microprocessor, the initial data of the second frame image after receiving the scanning-done signal.

3. The display method according to claim 2, further comprising:

transmitting, by the display driver chip at a preset frequency, a tear effect signal in an activated state to the microprocessor, wherein said providing, by the microprocessor, the initial data of the second frame image after receiving the scanning-done signal comprises: providing, by the microprocessor, the initial data of the second frame image after receiving the tear effect signal in the activated state and the scanning-done signal.

4. The display method according to claim 1, wherein said outputting, by the display panel, the scanning-done signal of the first frame image generated after scanning the plurality of rows of pixel circuits of the display panel comprises: transmitting, by the display panel, the scanning-done signal to the display driver chip; and wherein said writing, by the display driver chip, the initial data of the second frame image provided by the microprocessor comprises: beginning to write, by the display driver chip, the initial data of the second frame image in response to the scanning-done signal.

5. The display method according to claim 4, further comprising:

transmitting, by the display driver chip a tear effect signal in an activated state at a preset frequency to the microprocessor; and providing, by the microprocessor, the initial data of the second frame image to the display driver chip in response to the tear effect signal in the activated state, wherein a moment at which the microprocessor provides the initial data of the second frame image to the display driver chip is earlier than a moment at which the display driver chip receives the scanning-done signal.

6. The display method according to claim 1, wherein said outputting, by the display driver chip the display data of the second frame image to the display panel in response to the scanning-done signal, comprises:

transmitting, by the display driver chip, a tear effect signal in an activated state to the microprocessor at a preset frequency; and providing, by the microprocessor, the initial data of the second frame image to the display driver chip after receiving the tear effect signal in the activated state, wherein an initial moment at which the display driver chip writes the initial data of the second frame image is earlier than a moment at which the display driver chip receives the scanning-done signal.

7. The display method according to claim 6, wherein the display driver chip outputs the display data of the second frame image to the display panel after receiving the scanning-done signal and writing the initial data of the second frame image.

8. The display method according to claim 1, wherein the display panel comprises row scanning lines and a shift driver circuit, one of the row scanning lines is configured to drive one row of pixel circuits of the plurality of rows of pixel circuits, the shift driver circuit comprises shift registers that are cascaded, and output terminals of the shift registers are coupled to the row scanning lines; and wherein said outputting, by the display panel, the scanning-done signal of the first frame image generated after scanning the plurality of rows of pixel circuits of the display panel comprises: outputting, by the display panel, the scanning-done signal based on an enable signal output by a last-stage shift register of the shift registers in the shift driver circuit.

9. The display method according to claim 8, wherein the display apparatus comprises a conversion circuit comprising an input terminal electrically connected to an output terminal of the last-stage shift register; and the conversion circuit is configured to convert a signal input via the input terminal into a logic level matching the display driver chip or the microprocessor; and said outputting the scanning-done signal based on the enable signal output by the last-stage shift register in the shift driver circuit comprises: after the input terminal of the conversion circuit receives the enable signal output by the last-stage shift register, converting the enable signal into the scanning-done signal and outputting the scanning-done signal.

10. The display method according to claim 8, wherein the display apparatus further comprises a voltage regulator circuit configured to adjust a voltage of a signal input from an input terminal of the voltage regulator circuit to a voltage matching the display driver chip or the microprocessor; and wherein said outputting, by the display panel, the scanning-done signal of the first frame image generated after scanning the plurality of rows of pixel circuits of the display panel comprises: providing, by the display panel, the scanning-done signal to the voltage regulator circuit, and adjusting, by the voltage regulator circuit, a magnitude of the voltage of the scanning-done signal and outputting the scanning-done signal.

11. A display method, wherein the display method is applied to a display apparatus comprising a display panel, a display driver chip, and a microprocessor;

wherein the display method comprises:

outputting, by the display panel, a scanning-done signal of a first frame image generated after scanning a plurality of rows of pixel circuits of the display panel, wherein the scanning-done signal indicates that the display panel completes a data writing process of a frame image;

after the microprocessor or the display driver chip receives the scanning-done signal, writing, by the display driver chip, initial data of a second frame image provided by the microprocessor and outputting, by the display driver chip, display data of the second frame image to the display panel based on the initial data; or outputting, by the display driver chip, the display data of the second frame image to the display panel in response to the scanning-done signal, the display data being generated based on the initial data provided by the microprocessor; wherein the second frame image follows the first frame image; and transmitting, by the display driver chip, a tear effect signal in an activated state to the microprocessor at a preset frequency, wherein a period of an effective level of the scanning-done signal at least partially overlaps a lasting period of the tear effect signal in the activated state.

12. The display method according to claim 11, wherein said outputting, by the display panel, the scanning-done signal of the first frame image generated after scanning the plurality of rows of pixel circuits of the display panel comprises: transmitting, by the display panel, the scanning-done signal to the microprocessor; and wherein the display method further comprises:

providing, by the microprocessor, the initial data of the second frame image after receiving the scanning-done signal.

13. The display method according to claim 12, further comprising:

transmitting, by the display driver chip at a preset frequency, a tear effect signal in an activated state to the microprocessor.

* * * * *